INVENTOR.
DORWIN R. LARSEN

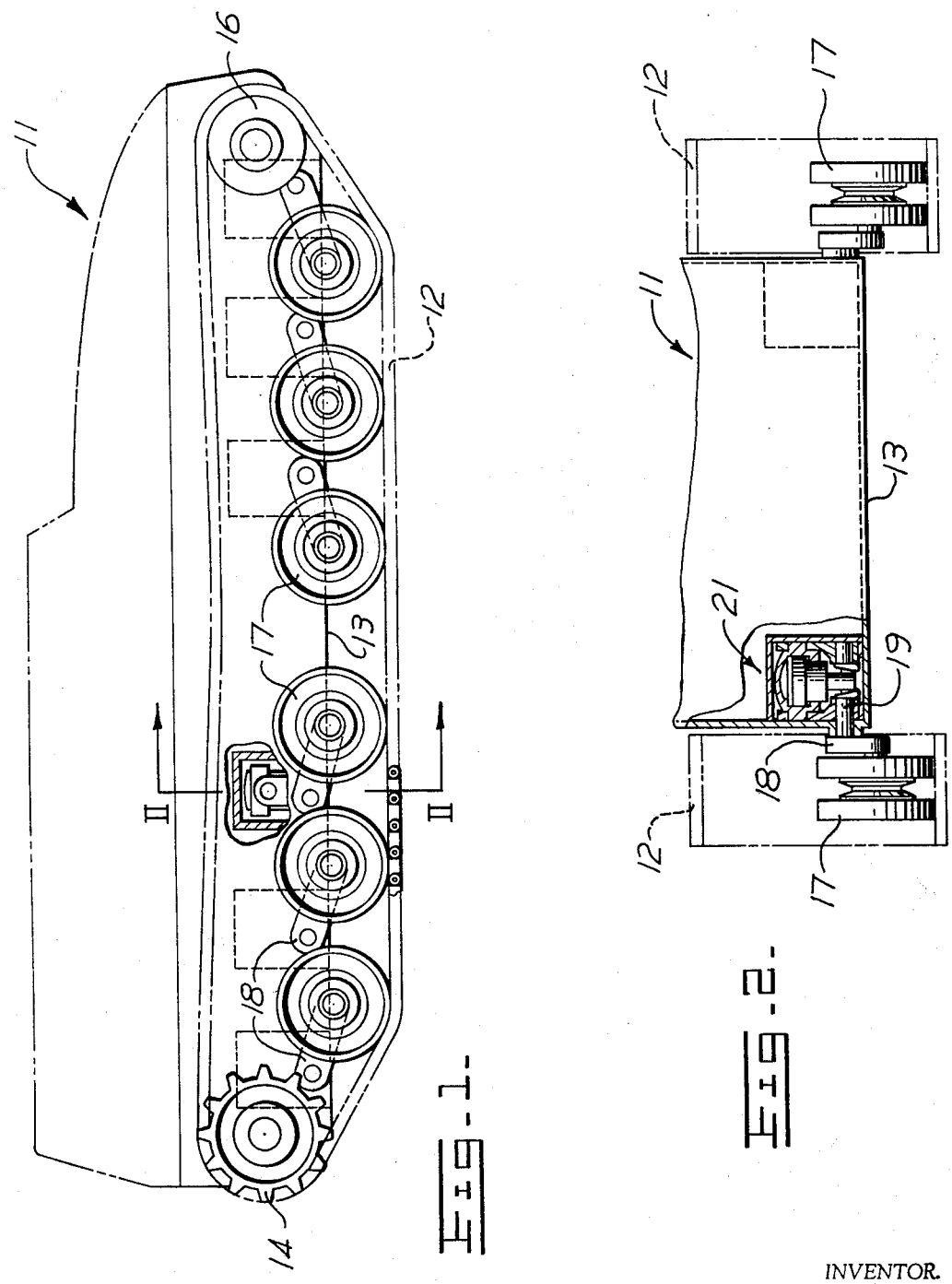

United States Patent Office 3,409,309
Patented Nov. 5, 1968

3,409,309
COMPACT SELF-CONTAINED SUSPENSION MECHANISM FOR VEHICLE WHEELS
Dorwin R. Larsen, Washington, Ill., assignor to Caterpillar Tractor Co., Peoria, Ill., a corporation of California
Filed Aug. 24, 1966, Ser. No. 574,617
6 Claims. (Cl. 280—124)

ABSTRACT OF THE DISCLOSURE

A vehicle wheel is carried on a pivot arm which extends from an axle journalled in the vehicle body. A portion of the axle has a center line offset from that of the principal portion of the axle and a very short stroke trunnion mounted hydro-pneumatic cylinder is coupled directly to the axle at the offset portion to provide resilient resistance to oscillation of the wheel, arm and axle relative to the vehicle body.

---

This invention relates to mechanisms for joining wheels to vehicles and more particularly to a very compact combined wheel mounting and suspension mechanism capable of providing for large vertical wheel deflections.

A variety of suspension systems are used for resiliently connecting wheels to vehicles so that an individual wheel may deflect upwardly over an obstacle without imparting a pronounced similar motion to the vehicle as a whole. Mechanical springs or pneumatic suspension cylinders are extensively used in conjunction with a pivoting primary connection between the wheel and vehicle to achieve such a result. Such systems are inherently bulky and variously require shock absorbers, snubbers, mechanical stops, pneumatic or hydraulic control circuits, and other additional components to regulate or limit the action of the suspension. Such systems complicate the vehicle undercarriage and add substantial weight thereto.

Prior forms of vehicle wheel connection have been designed primarily from the standpoint of providing a smoother ride, greater vehicle stability, adjustment to varying loads, and other functional factors, with relatively little attention being paid to compactness. There are circumstances, however, where it can be very important to have a simple and compact suspension without sacrificing functional advantages identified above.

Many military combat vehicles for example, such as tanks, some armored personnel carriers, and the like, have a series of individually mounted roadwheels which carry endless tracks and which require a resilient suspension that must operate on very difficult terrain. It may be extremely important that such a vehicle have a very low silhouette. A low vehicle is a more difficult target for enemy fire in addition to being more stable when traveling over sloping or rough ground. Most track type military vehicles, however, have heretofore employed a torsion bar type of suspension. This, as well as other conventional suspension systems, is too bulky to permit a minimum vehicle height and minimum undercarriage complication to be realized.

Further desirable characteristics of vehicles of the class discussed above are that the suspension mechanism be self contained, i.e. that no supplementary shock absorbers, stops, external control components, or the like be required, that it be highly reliable, and that it be readily susceptible to being enclosed for the protection of component elements.

A class of suspension device which offers many advantages in this type of vehicle uses a hydro-pneumatic cylinder suspension, an example thereof being disclosed in U.S. Patent 3,254,738, entitled, Suspension System for Vehicles, and issued June 7, 1966. In these systems as heretofore constructed each wheel is connected to the vehicle by a pivot arm. A telescoping hydro-pneumatic cylinder is coupled to the pivot arm, by means of a lever projecting therefrom, and is also pivotably connected at the upper end to the vehicle frame to control vertical movement of the associated wheel. Within the cylinder a gas volume resists upward pivoting of the wheel relative to the vehicle frame and a hydraulic fluid volume controls the rebound or downward movement. Several characteristics of this conventional hydro-pneumatic cylinder system such as the lever, the pivot connection at the top of the cylinder, etc., make it unduly bulky, particularly in the vertical direction, from the standpoint of reducing vehicle height. Further, the conventional construction does not fully realize the several other desiderata discussed above.

The present invention is a combined wheel connection and suspension system which provides the above discussed features in a very compact self contained unit. A specialized very short cylinder is used to provide for extremely large wheel deflections by connecting the cylinder to the vehicle body and to the pivot arm which carries the wheel in a unique manner. Among other novel features, the short stroke cylinder is coupled directly to the pivot axle of the arm which carries the wheel, at an eccentric section on the axle, and is pivoted to the vehicle at the body of the cylinder rather than at the end thereof.

Accordingly it is an object of this invention to provide a very compact, light weight and reliable connection and suspension system for joining wheels to a vehicle.

It is another object of the invention to provide for large vertical deflections of a vehicle wheel with a connection and suspension system of a very small vertical extent.

It is still another object of the invention to provide a self contained compact wheel suspension mechanism for a vehicle which requires no external shock absorbers, stops, snubbers, control circuitry or the like.

It is a further object of the invention to provide a wheel suspension system for a vehicle which is more adaptable to being enclosed within a compact housing.

It is still a further object of this invention to provide a hydro-pneumatic suspension for a vehicle wheel in which internal leakage problems are minimized.

The invention, together with further objects and advantages thereof, will be better understood by reference to the following specification together with the accompanying drawings, of which:

FIG. 1 is a side elevation view, partially broken-out, of the track, roadwheels, and roadwheel connection and suspension system, of a military tank vehicle;

FIG. 2 is a cross section view taken along line II—II of FIG. 1 illustrating internal details of the roadwheel mounting and suspension thereof;

Figure 3:
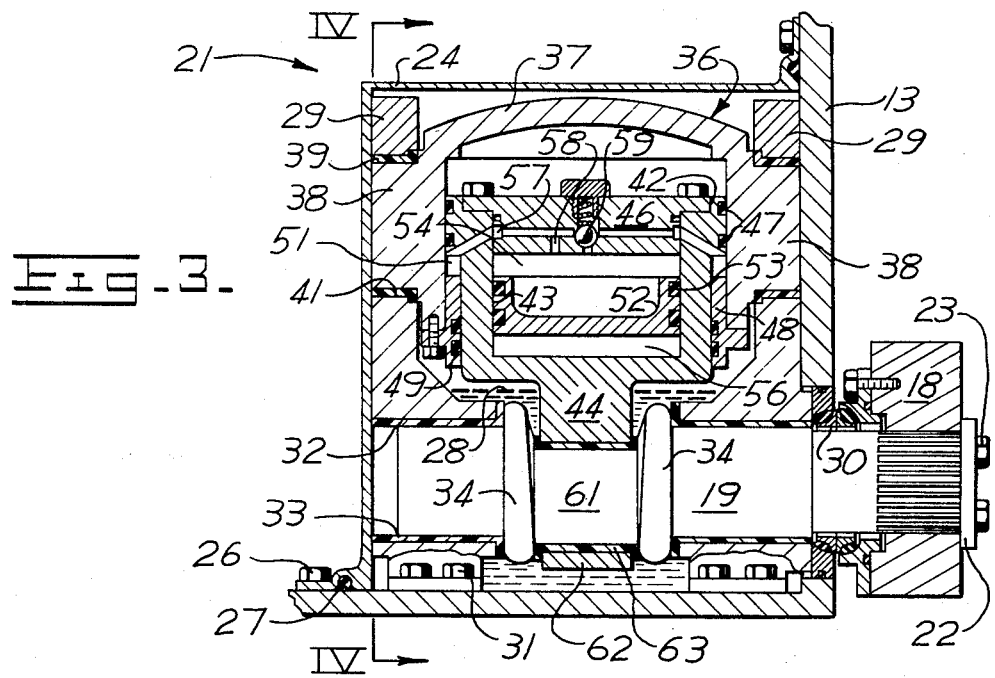
FIG. 3 is a cross section view of hydro-pneumatic wheel suspension cylinder and associated structure of the vehicle shown in FIGS. 1 and 2.

Referring now particularly to FIG. 1 of the drawing, an armored military combat vehicle 11 is indicated in outline form, the vehicle being of the track type and being one in which a low profile is desired. In a vehicle of this class, the articulated endless track 12 at each side of the vehicle body 13 is carried by a drive sprocket 14 at the rearward end of the body and an idler 16 at the forward end and the vehicle is supported by a series of individually mounted roadwheels 17 which ride on the track.

To provide for vertical movement of each roadwheel 17 independently of the others, each roadwheel is mounted on one end of a pivot arm 18 which is slightly inclined in the normal riding position of the wheel. In this example of the invention, six roadwheels 17 are provided at each side of the vehicle 11 with the pivot arms 18 of the forward three wheels extending forwardly therefrom and with the pivot arms of the rest extending backward therefrom, it being understood that the number of roadwheels and the direction of the pivot arms thereof may vary in accordance with the requirements of particular vehicle design.

Referring now to FIG. 2 in conjunction with FIG. 1, the end of each pivot arm 18 remote from wheel 17 is pivotably connected to the vehicle body 13 by a short axle 19 which extends into a hydro-pneumatic cylinder assembly 21 situated inside the vehicle body 13 adjacent the end of the pivot arm. A separate cylinder assembly 21 is provided for each of the wheels 17 and functions both to connect the wheel to the vehicle and to provide a resilient suspension therefor.

Figure 4:
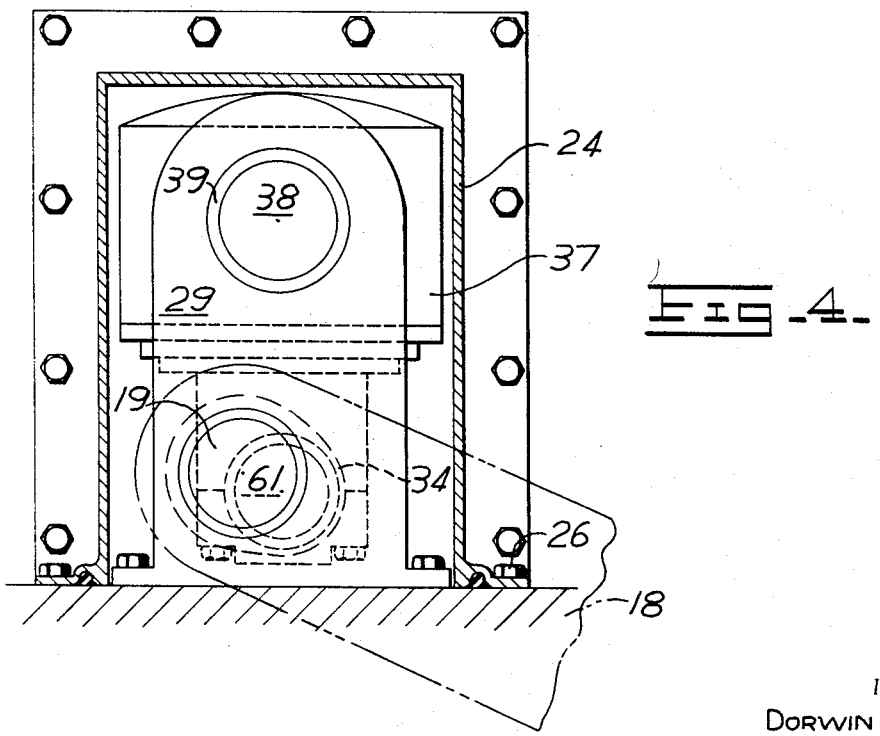
FIG. 4 is an elevation section view taken along line IV—IV of FIG. 3 further clarifying the relationship between the hydro-pneumatic cylinder and associated structure.

Referring now to FIGS. 3 and 4 in conjunction, the pivot arm 18 which carries each roadwheel is splined to an end of axle 19 which projects from the side of the vehicle body 13 and is rigidly secured to the axle by an end cap 22 and cap screws 23 so that the axle is constrained to turn as the arm pivots.

The cylinder assemblies 21 are of the general class in which a compressed gas volume exerts a downward force on the associated roadwheel and in which downward movement of the roadwheel is yieldably resisted by a liquid volume which must flow through a restricted aperture to permit such movement. Considering now the internal construction of a representative one of the cylinder assemblies 21, all elements thereof are enclosed within a fluid tight housing 24 which is secured to the floor and sidewall of the vehicle body 13, by bolts 26, over axle 19. A seal 27 is disposed along the juncture between the housing 24 and vehicle body 13 to prevent the entrance of dust or the like and to provide for the retention of a volume of oil 28 therein. For similar reasons, an annular seal 30 is disposed around axle 19 at the sidewall of the vehicle body 13.

A pair of spaced apart brackets 29 are secured to the floor of the vehicle body 13 within housing 24, by bolts 31, and project upwardly therein, one bracket being adjacent each side of the housing. The hereinabove described pivot axle 19 extends through a bore 32 near the base of each bracket 29 with sleeve bearings 33 being provided in each bore to journal the axle therein. A pair of flange sections 34 are situated on the axle 19 between the brackets 29, and adjacent thereto, to position the axle longitudinally. Flange sections 34 in conjunction with the brackets 29 thus form the primary connection between the vehicle 11 and the roadwheels 17 thereof.

The above described connection between the roadwheels and the vehicle allows each wheel to pivot relative to the vehicle about axle 19 and thus it is necessary to provide means for normally holding the wheel downward in order to support the weight of the vehicle thereon. Such means must also allow pivoting of the wheel in response to localized elevations or depressions in the surface on which the vehicle travels while providing for restoring forces which yieldably resist such pivoting. A telescoping hydro-pneumatic suspension device 36 is wholly contained within each assembly 21 for this purpose.

Components of the suspension device 36 include a cylinder 37 having a closed upper end which is pivotably mounted between brackets 29 by trunnion pins 38, one of which projects sidewardly from each side of the cylinder. Each trunnion 38 extends into a sleeve bearing 39 mounted in a bore 41 in the adjacent bracket 29 so that the cylinder 37 may turn about an axis parallel to the wheel arm axle 19. The trunnion mounting of the cylinder 37, as contrasted with a pivot connection above the upper end thereof, is an important factor in minimizing the bulk and vertical extent of the wheel suspension.

A slidable piston 42, disposed within cylinder 37, has a chamber 43 and a piston rod section 44 thereunder which extends downwardly to axle 19. The upper end of chamber 43 is closed by a circular top plate 46 secured to the piston 42 and annular high pressure seals 47 are disposed therearound to provide a fluid tight fit with the cylinder 37. The body of the piston 42 below seals 47 is of reduced diameter and extends through a sleeve 48 near the base of cylinder 37, high pressure seals 49 being disposed between the sleeve and the piston body. An annular oil chamber 51, the function of which will be hereinafter discussed, is thus formed between the piston 42 and the wall of cylinder 37 between seals 47 and 49.

A free piston 52, having seals 53 around the circumference thereof, is slidably disposed within the chamber 43 of piston 42 dividing the chamber into an upper sub-chamber 54 and lower sub-chamber 56. The upper sub-chamber 54 contains oil and is communicated with the previously described chamber 51 by a passage 57 in the piston 42 and piston top plate 46 which passage has a flow restriction 58 therein. A check valve 59, mounted in top plate 46, bypasses the flow restriction 58 providing an additional flow path from upper sub-chamber 54 to chamber 51 in one direction only. Thus, for reasons which will be hereinafter discussed with respect to the operation of the invention, oil may flow from the upper sub-chamber 54 to chamber 51 at a more rapid rate than it may flow in the reverse direction.

Considering now an important aspect of the invention with respect realizing a compact structure, and a large maximum wheel deflection, the piston rod 44 is coupled directly to the wheel pivot axle 19 at an eccentric section 61 thereof. A ring connection 62 at the lower end of the piston rod 44 encircles eccentric section 61 of the axle and a bushing 63 disposed therebetween. Owing to the offset of the eccentric section 61 from the remaining portion of the axle 19, any pivoting motion of the wheel arm 18 must be accompanied by vertical movement of piston 52 within cylinder 37.

Considering now the operation of the above described structure as well as certain further characteristics thereof, a charge of high pressure gas, such as nitrogen or compressed air, is provided within cylinder 37 above piston 42 and a second high pressure gas charge is introduced into the lower sub-chamber 56 within the piston. As previously discussed, the upper sub-chamber 54 within piston 42 and the cylinder region 51 which is communicated therewith is filled with a hydraulic fluid such as oil.

Thus the gas charge above piston 42 exerts a downward force thereon which is opposed by the oil pressure within the cylinder region, or rebound chamber, 51. This oil pressure derives from the high pressure gas charge within piston lower sub-chamber 56 which exerts an upward force against the free piston 52. The resulting oil pressure within upper sub-chamber 54 is transmitted to rebound chamber 51 through passage 57, aperture 58 and check valve 59.

The initial pressures of the gas charge above piston 42 and the gas charge within lower piston sub-chamber 56 are related to the dimensions of the piston structure, the weight of the vehicle and number of supporting wheels, the length of pivot arm 18, the spring force rate change which is desired, and other factors known to the art, so that the pivot arm 18 and associated wheel is held at the preferred riding position when the vehicle is normally loaded and there are no irregularities in the surface over which the vehicle is traveling. However the gas pressures and the dimensioning of the piston 42 and connecting structure, in this invention, are selected to provide a very short stroke piston to further contribute to the desired foreshortening of the vertical extent of the suspension and to enable the unique coupling of the piston directly to axle 19 to be utilized.

It has also been found to be very advantageous to proportion the structure so that the gas pressure above piston 42, in the normal riding condition, is substantially the same as the oil pressure within rebound chamber 51 thereby minimizing any tendency for leakage to occur around the piston seals 47. Any leakage which may occur at the lower seals 49 is automatically compensated for by upward movement of the free piston 52.

Considering now the action of the suspension when subjected to abnormal forces, it may be seen that upward movement of the pivot arm 18 and associated wheel relative to the body of the vehicle such as may result from increased loading of the vehicle or the overriding of an obstacle by the wheel will necessarily raise piston 42 within cylinder 37. This piston movement is accompanied by a flow of oil from upper sub-chamber 54 to the then expanding rebound chamber 51 through passage 57 and check valve 59.

The high pressure gas charge above piston 42 resists such upward movement of the piston with a force which increases as the piston rises thereby providing the desired springing of the vehicle as well as a snubbing effect. The gas charge pressure also acts to restore the pivot arm 18 and wheel to the preferred riding position when the abnormal force thereon has been relieved.

Pivoting of the arm 18 and associated wheel downwardly relative to the vehicle body following the upward pivoting discussed above, or from other causes such as unloading of the vehicle moves the piston 42 downwardly within cylinder 37. Damping of the rebound movement results from the fact that oil must flow from rebound chamber 51 into the piston sub-chamber 54, against the gas pressure in sub-chamber 56, to permit downward motion of the piston. Owing to check valve 59, oil returns to the upper sub-chamber 54 only through the flow restriction 58 and thus at a slower rate than it can flow in the reverse direction during upward motion of piston 42.

Thus all vehicle wheel connection and suspension requirements are met in a very compact self-contained unit which can provide for unusually large maximum wheel deflections. In one example of the invention, using a piston 9 inches in diameter with a 1.83 inch stroke, a maximum wheel deflection of 14 inches is realized with excellent ride characteristics. This exceeds, substantially, the maximum wheel deflections of typical prior track type military vehicles.

While the invention has been herein described with reference to a tracked combat vehicle, it will be apparent that the invention is applicable to non-military vehicles and to many types of vehicle which do not utilize tracks.

What is claimed is:

1. A suspension mechanism for joining a wheel to a vehicle which is supported thereby comprising, in combination, an axle having first and second portions of cylindrical cross-section which have parallel axes extending transversely with respect to said vehicle, the axis of said second portion of said axle being offset radially from the axis of said first portion thereof, said radial offset being less than the radius of said first portion, said first portion of said axle being journalled to said vehicle, a pivot arm rigidly secured to said axle and projecting away from the rotary axis thereof, said pivot arm having said wheel mounted thereon, and a telescoping cylinder suspension device of the class which yieldably resists compression, a first portion of said suspension device being pivotably coupled to the body of said vehicle and another portion of said suspension device being pivotably coupled to said axle at said second portion thereof whereby said suspension device is compressed by pivoting of said arm and resists such pivoting.

2. A suspension mechanism as defined in claim 1 wherein said telescoping cylinder suspension device has opposite ends one of which is coupled to said axle, and wherein the pivotable coupling between said suspension device and the body of said vehicle is at an intermediate position between the ends of said suspension device.

3. A suspension mechanism as defined in claim 1 wherein trunnions project from said suspension device at a position thereon intermediate between the ends thereof, said trunnions being parallel to said axle, and wherein baring members secured to said body of said vehicle engage said trunnions to form said pivotable connection between said suspension device and the body of said vehicle.

4. A suspension mechanism as defined in claim 1 wherein said axle is journalled to said vehicle within coaxial bores in a pair of spaced apart brackets secured thereto, said offset second portion of said axle being between said brackets thereby holding said axle and said pivot arm on said vehicle while providing for pivoting of said arm.

5. A suspension mechanism as defined in claim 1 wherein said suspension device is a hydro-pneumatic cylinder of the class having a closed ended cylinder with a slidable piston therein and having a first high pressure gas volume opposing movement of said piston towards said closed end and a high pressure hydraulic fluid volume opposing movement of said piston away from said closed end, and wherein a piston rod connects said piston with said second portion of said axle to form said pivotable coupling of said suspension device to said axle, and wherein the pressure within said first gas volume and the pressure within said hydraulic fluid volume are substantially the same when said wheel is at the normal riding position thereof.

6. A suspension mechanism as defined in claim 1 wherein said suspension device is a hydro-pneumatic cylinder of the class having a closed ended cylinder with a slidable piston therein and having a first high pressure gas volume opposing movement of said piston towards said closed end and a high pressure hydraulic fluid volume opposing movement of said piston away from said closed end, and wherein a piston rod connects said piston with said second portion of said axle to form said pivotable coupling of said suspension device to said axle, and wherein said first high pressure gas volume is situated between said piston and said cloesd end of said cylinder and wherein a seal is provided between said piston and the opposite end of said cylinder forming a first chamber therebetween containing said hydraulic fluid volume, said piston having a second chamber therein with an internal free piston slidably disposed therein and dividing said second chamber into first and second sub-chambers with said first sub-chamber being communicated with said first chamber through a passage having a flow restriction therein and also through a check valve which bypasses said flow restriction and transmits fluid only towards said first chamber.

References Cited

UNITED STATES PATENTS

| 2,405,733 | 8/1946 | Boldt | 267—15 X |
| 2,608,419 | 8/1952 | Watts | 280—96.2 |
| 3,063,510 | 11/1962 | Hunger | 180—9.2 |
| 3,254,738 | 6/1966 | Larsen | 180—9.2 |
| 3,262,522 | 7/1966 | Johnson | 180—9.2 X |

OTHER REFERENCES

Frieseke, German printed application No. 1,152,617, August 1963.

RICHARD J. JOHNSON, *Primary Examiner.*